Aug. 11, 1953 A. LESLIE 2,648,402
ICE SWAY CONTROL
Filed Sept. 15, 1950 2 Sheets-Sheet 1
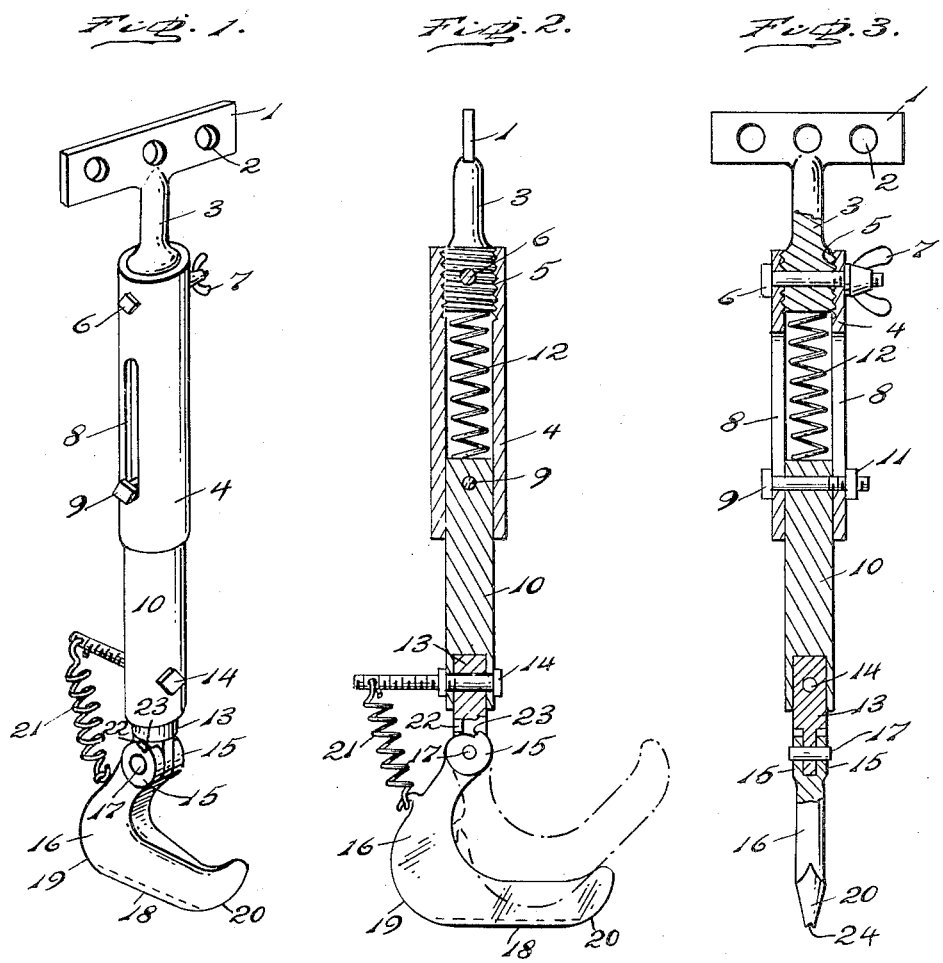
INVENTOR
Albert Leslie
BY
Herbert S. Fairbanks
ATTORNEY Aug. 11, 1953　　　A. LESLIE　　　2,648,402
ICE SWAY CONTROL Filed Sept. 15, 1950　　　2 Sheets-Sheet 2

INVENTOR
Albert Leslie
BY
Herbert S. Fairbanks
ATTORNEY

Patented Aug. 11, 1953

2,648,402

UNITED STATES PATENT OFFICE 2,648,402

ICE SWAY CONTROL

Albert Leslie, Shanesville, Pa.

Application September 15, 1950, Serial No. 185,117

2 Claims. (Cl. 188—5)

The object of this invention is to devise a novel ice sway control which will overcome the hazards of motor travel during conditions of ice or snow by holding the motor vehicle to its prescribed course.

A further object of the invention is to provide a novel construction of a ground engaging shoe or skate which has a cushioning mounting on the motor vehicle; which is pivotally supported to permit the shoe to swing upward on its pivot on striking an obstruction in the road and which is tensioned to cause it to move downwardly as soon as the obstruction is passed.

The ice sway control is mounted preferably on the chassis of the motor vehicle and is positioned so that the ground engaging shoe is between the rear wheels of the motor vehicle and thereby contributes to prevent the skidding of the rear portion of the motor vehicle.

With the foregoing and other objects in view as will hereinafter clearly appear, my invention comprehends a novel ice sway control.

It further comprehends a novel construction and arrangement of a ground engaging shoe and a novel manner of mounting it on a motor vehicle.

For the purpose of illustrating the invention, I have shown in the accompanying drawings preferred embodiments of it which, in practice, will give satisfactory and reliable results. It is, however, to be understood that the various instrumentalities of which the invention consists can be variously arranged and organized, and the invention is not limited to the exact arrangement and organization of these instrumentalities as herein set forth.

Figure 1 is a perspective view of an ice sway control, embodying my invention.

Figure 2 is a side elevation, partly in section.

Figure 3 is a section on lines 3—3 of Figure 1.

Similar numerals of reference indicate corresponding parts.

Figure 4:
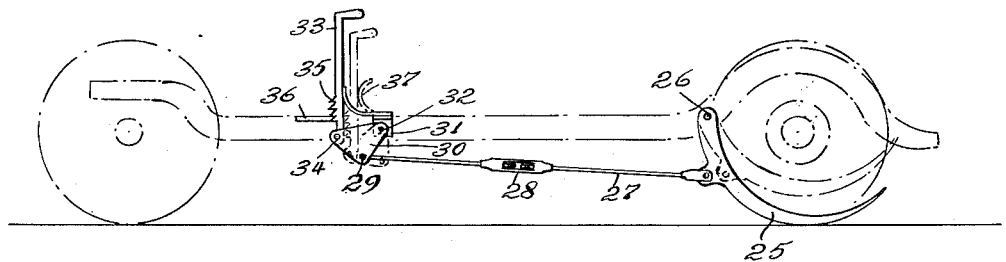
Figure 4 is a side elevation of another embodiment of the invention.

Referring to the drawings:

Referring first to the embodiment seen in Figs. 1, 2 and 3, a bracket 1, of any desired contour, has apertures 2 to adapt it to receive fastening devices for securing it to the rear bumper or other part of a motor vehicle. The bracket 1 has a depending post 3 which is threaded to engage the internal threads of a sleeve 4 as shown at 5, and the sleeve and post are fixed in position by a bolt 6 passing through the sleeve and post, the bolt carrying a conventional nut 7.

The sleeve 4 has longitudinally extending slots 8 through which a bolt 9 extends, said bolt 9 also passing through a rod 10 and being provided with a nut 11. The rod 10 telescopes into the sleeve 4, and a spring 12 within the sleeve is interposed between the post 3 and the upper end of the rod 10 and tends to move the rod 10 downwardly.

The rod 10 is recessed at its lower end to receive a carrier post 13 which is fixed thereto by a bolt 14. The post 13 has its lower end flattened to be received between the spaced shoulders 15 of a skate or ground engaging shoe or skate 16, mounted on the post 15 by a pivot pin 17. The ground engaging shoe has a substantially flat ground engaging face 18 which merges at one end into the upwardly rounded rear face 19 and at the opposite end into the upwardly rounded front face 20. A spring 21 connected with the bolt 14 and the shoe 16 tends to retain the flat bottom portion of the shoe in contact with the ground. The pivotal movement of the shoe in one direction is limited to a forty five degree angle by a shoulder 22 on the post 13 and shoulders 23 on spaced ears 15 of the shoe. The sleeve 4 and rod 10 form a carrier for the post 13 and the sleeve and rod which is longitudinally movable in the sleeve together with the spring 12 form a resilient mounting for the post 13.

It will thus be apparent that the spring 12 will cushion high or rough spots on the rod, and any abnormal obstruction is taken care of by the swinging movement of the shoe on the post 13. If desired, the shoe may have a groove 24 similar to that employed in a skate to provide additional gripping surfaces, such groove extending longitudinally in the bottom face of the shoe between opposite edges.

In the embodiment of the invention hereinbefore described, the action of the shoe is automatic and the moving parts return to their initial positions by spring means.

Figure 5:
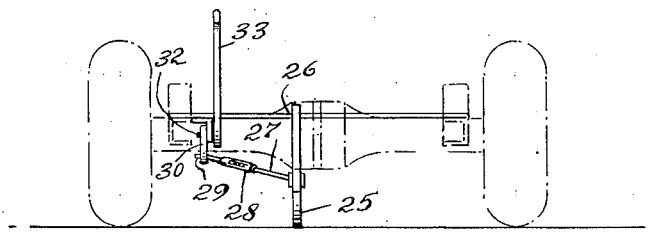
Figure 5 is a rear elevation of the construction seen in Figure 4.

In Figures 4 and 5, I have shown another embodiment of the invention wherein the ground engaging shoe is manually set in its operative or inoperative position.

A curved, ground engaging shoe 25 is pivoted at 26 to any desired portion of a motor vehicle, for example at the rear portion of the chassis so that the shoe 25 will be positioned at a selected point between the rear wheels of the motor vehicle. The ground engaging shoe is pivoted at 26 to a fixed portion of the motor vehicle and is operated by a sectional link 27 having a turnbuckle 28. The link 27 is pivotally connected with the shoe and with a lever plate 29 at 30. The plate 30 is pivotally connected with an angle bracket 31 at 32, the bracket being connected in any desired manner wih a fixed portion of the motor vehicle such as the chassis. A lever handle 33 is pivotally connected at 34 with the plate 31 and has a ratchet 35 cooperating with a fixed pawl 36. If desired a spring 37 may be employed to move the ratchet towards the pawl.

The operation will now be apparent to those skilled in this art and is as follows:

Referring first to the embodiment seen in Figures 1 to 3 inclusive, the bracket 1 is fixed in any desired manner to a fixed portion of the chassis or to the rear bumper.

When the ice sway control is not to be used, the bracket can be left in place, the bolt 6 and the remaining parts removed.

The spring 12 tends to cause the downward movement of the shoe and its contact with the ground. I provide a non-revolving ground engaging member which slides on the ground between the wheels and prevents skidding or side slip of the rear portion of the motor vehicle. It will be apparent that the location of the shoe may be selected for a position at any desired point between the wheels.

The shoe is free to rise and lower due to irregularity in the surface of the road, and is also free to turn on its pivot within a defined range.

In the embodiment seen in Figures 4 and 5, when the operator desires to bring the shoe into ground engaging position he draws the lever handle 33 rearwardly and upwardly, thereby turning the angle bracket on its pivot and exerting a pull on the link 27 and moving the shoe into ground contact. The ratchet and pawl retain the lever handle in adjusted position.

Having thus described my invention, what I claim as new and desire to secure by Letters Patent is:

1. In an ice sway control for motor vehicles, a carrier adapted for rigid connection with a motor vehicle, said carrier comprising a sleeve, a rod telescoping into the sleeve and having limited longitudinal movement therein, a spring tending to move the rod outwardly of the sleeve a post non-rotatably mounted on the rod, the post having a shoulder at its lower end, a shoe having a flat face contacting the ground in the normal position of the shoe and having at one end ears between which the lower end of the post extends, a pivot connecting said post and ears, said ears having shoulders cooperating with the shoulder of the post to limit upward and rearward pivotal movement of the shoe caused by a road obstruction to a forty five degree angle, and a spring between the shoe and post resisting such pivotal movement of the shoe and returning the shoe when released from said road obstruction to its normal position with the flat face of the shoe contacting the ground.

2. The construction defined in claim 1, wherein the carrier has a bracket to rigidly connect it with the motor vehicle to be perpendicular to the ground.

ALBERT LESLIE.

References Cited in the file of this patent

UNITED STATES PATENTS

| Number | Name | Date |
|---|---|---|
| 1,808,852 | Lance | June 9, 1931 |

FOREIGN PATENTS

| Number | Country | Date |
|---|---|---|
| 426,571 | France | July 10, 1911 |
| 840,973 | France | May 8, 1939 |
| 518,864 | Germany | June 28, 1929 |